United States Patent [19]

Togashi et al.

[11] Patent Number: 5,064,881

[45] Date of Patent: Nov. 12, 1991

[54] EPOXY RESIN COMPOSITION AND SEMICONDUCTOR SEALING MATERIAL COMPRISING SAME BASED ON SPHERICAL SILICA

[75] Inventors: Eiki Togashi; Hisashi Matsumoto, both of Ichihara, Japan

[73] Assignee: Mitsui Petrochemical Industries, Ltd., Tokyo, Japan

[21] Appl. No.: 466,033

[22] Filed: Jan. 16, 1990

[30] Foreign Application Priority Data

Jan. 18, 1989 [JP] Japan .................................. 1-7684
Jan. 18, 1989 [JP] Japan .................................. 1-7685
Jan. 19, 1989 [JP] Japan .................................. 1-8692

[51] Int. Cl.$^5$ ...................... C08G 59/62; C08G 59/68
[52] U.S. Cl. ...................... 523/443; 525/481; 525/482; 525/486
[58] Field of Search ............ 523/443; 525/481, 482, 525/486

[56] References Cited

U.S. PATENT DOCUMENTS

| | | | |
|---|---|---|---|
| 4,615,741 | 10/1986 | Kobayashi et al. | 523/443 |
| 4,701,479 | 10/1987 | Shiobara et al. | 523/466 |
| 4,720,515 | 1/1988 | Iji et al. | 523/435 |
| 4,876,324 | 10/1989 | Nakano et al. | 528/144 |

FOREIGN PATENT DOCUMENTS 0092547 1/1983 Japan .

Primary Examiner—John Kight, III
Assistant Examiner—Frederick Krass
Attorney, Agent, or Firm—Nixon & Vanderhye

[57] ABSTRACT

Disclosed is an epoxy resin composition comprising, as basic components, (A) an epoxy resin, (B) a phenol-novolak resin, (C) a curing promotor and (D) a filler. Pulverized or spherical silica having specific particle size characteristics is used as the filler (D). Preferably, a halogenated epoxy resin and antimony oxide are further incorporated in this epoxy resin. This epoxy resin composition shows a very small molding shrinkage. If a dialkylurea derivative is used as the curing promotor (C), the stability of the composition at about 100° C. is drastically improved and the flowability of the composition is improved. Accordingly, precision injection molding becomes possible, and the effect of sealing a semiconductor is enhanced.

11 Claims, No Drawings

EPOXY RESIN COMPOSITION AND SEMICONDUCTOR SEALING MATERIAL COMPRISING SAME BASED ON SPHERICAL SILICA

BACKGROUND OF THE INVENTION (1) Field of the Invention

The present invention relates to an epoxy resin composition. More particularly, the present invention relates to an epoxy resin composition which has a very small molding shrinkage and an excellent precision moldability and can be valuably used as a sealing material for a semiconductor.

(2) Description of the Related Art

Since an epoxy resin is excellent in the bonding strength, chemical resistance, mechanical strength and electrically insulating property, the epoxy resin is widely used as an adhesive, a coating material, a cast product and a molded article. Especially, the molded article is widely applied to an electrical part or electronic part while the excellent electrically insulating property is effectively utilized. As an example of this application, there can be mentioned an epoxy resin composition to be used for sealing a semiconductor. For instance, Japanese Unexamined Patent Publication No. 61-268750 discloses a composition comprising a phenol-curable epoxy resin and a mixed quartz filler comprising 1 to 80% by weight of spherical quartz powder having an average particle size of 1 to 25 $\mu$m and 20 to 99% by weight of pulverized quartz powder. This composition is conveniently used for sealing a semiconductor because the flowability is good at the step of forming a semiconductor, the thermal expansion coefficient is small and the cracking resistance is high. Japanese Unexamined Patent Publication No. 61-83615 discloses a composition for use in attaining the same object, which comprises a cresol-novolak type epoxy resin and a phenol-novolak curing agent at an epoxy resin/curing agent equivalent ratio of from 1.1 to 1.5, and pulverized or spherical silica having an average particle size of up to 15 $\mu$m and a maximum particle size of up to 100 $\mu$m. Also this composition has excellent cracking resistance and moisture resistance, and a product having a low stress can be obtained by deviating the epoxy resin/curing agent equivalent ratio from the normal equivalent ratio. It is taught that this composition is therefore used for sealing a semiconductor.

In the epoxy resin to be used for an electrical or electronic part, by incorporating silica and appropriately adjusting the particle size and the like, trials have been made to obtain a composition capable of providing desired properties.

With recent development of the electronic technique and the like, appearance of a molded article having a very high dimension precision is desired, and this desire is not satisfied only by the selection of the kind and particle size of silica.

Since the epoxy resin has such a characteristic property that the stability becomes poor at about 100° C., only press molding or transfer molding is applicable as the molding method, and the preparation of a precise molded article by injection molding is impossible and the productivity of the molded article is low. Moreover, even if a composition having a small molding precision is developed, the composition can hardly be applied to the production of a precision-molded article.

SUMMARY OF THE INVENTION

It is therefore a primary object of the present invention to provide an epoxy resin composition having a very small molding shrinkage and also having excellent cracking resistance, moisture resistance and flame retardancy.

Another object of the present invention is to provide an epoxy resin composition, from which a precise molded article can be prepared by injection molding.

Still another object of the present invention is to provide an epoxy resin composition which can be formed into a molded article having high cracking resistance, high moisture resistance, high flame retardancy and low percent shrinkage, can be molded by precision injection molding and is excellent in the property of sealing a semiconductor.

According to the present invention, an epoxy resin composition having a very small molding shrinkage is provided by incorporating specific pulverized silica and/or spherical silica into a composition comprising an epoxy resin, a phenol-novolak resin and a curing promotor, and an epoxy resin composition having a prominently improved flame retardancy is provided by incorporating a halogenated epoxy resin and antimony oxide and/or a glass fiber into the above epoxy resin composition.

More specifically, in accordance with the present invention, there is provided an epoxy resin composition which comprises, as indispensable components, (A) an epoxy resin, (B) a phenol-novolak resin, (C) a curing promotor, and (D) pulverized silica having a maximum particle size of up to 130 $\mu$m and an average particle size of up to 30 $\mu$m and/or spherical silica having a maximum particle size of up to 200 $\mu$m and an average particle size of up to 50 $\mu$m. Furthermore, according to the present invention, there is provided an epoxy resin composition as set forth above, which further comprises (E) a halogenated epoxy resin and (F) antimony oxide and/or (G) a glass fiber. Moreover, according to the present invention, there is provided a semiconductor sealing material which comprises an epoxy resin as set forth above. An epoxy resin composition having an especially small molding shrinkage is provided when a novolak type epoxy resin having an epoxy equivalent of 100 to 300 is used as the epoxy resin, a novolak type phenolic resin having a hydroxyl group equivalent of 100 to 150 and a softening point of 60° to 110° C. is used as the phenol-novolak resin, pulverized silica having a maximum particle size of up to 60 $\mu$m and an average particle size of up to 8 $\mu$m is used as the pulverized silica, spherical silica having a maximum particle size of up to 30 $\mu$m and an average particle size of up to 5 $\mu$m is used as the spherical silica and a brominated novolak-epoxy resin is used as the halogenated epoxy resin.

Still further, according to the present invention, by incorporating a specific dialkylurea derivative as the promotor into a composition comprising an epoxy resin and a phenol-novolak resin, the stability at about 100° C. is prominently improved. If this curing promotor is used in combination with the above-mentioned additives such as spherical silica, an epoxy resin composition having a much reduced molding shrinkage is provided.

Namely, in accordance with one preferred embodiment of the present invention, there is provided an epoxy resin composition which comprises (A) an epoxy resin, (B) a phenol-novolak resin and (C) a curing promotor selected from the group consisting (a) urea derivatives represened by the following formula:

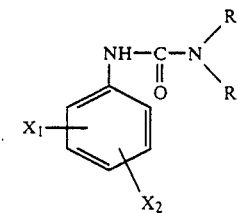

wherein $X_1$ and $X_2$, which may be the same or different, represent a hydrogen atom, a halogen atom, a lower alkyl group, a lower alkoxy group or a nitro group, and R's, which may be the same or different, represent a lower alkyl group, (b) urea derivatives represented by the following formula:

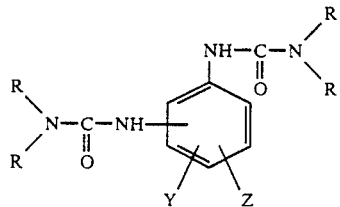

wherein Y and Z which may be the same or different, represent a hydrogen atom, a halogen atom or a lower alkyl group, and R's, which may be the same or different, represent a lower alkyl group, (c) urea derivatives represented by the following formula:

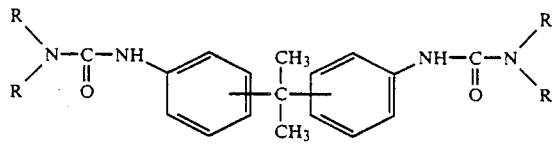

wherein R's, which may be the same or different, represent a lower alkyl group, (d) urea derivatives represented by the following formula:

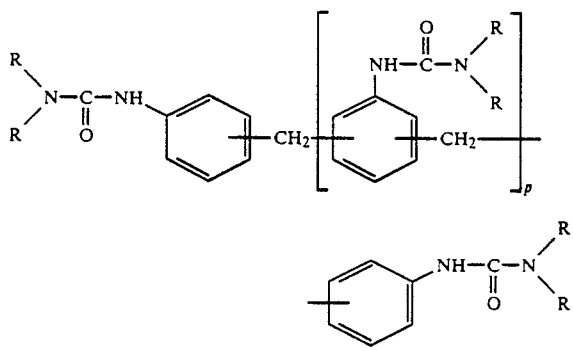

wherein p is an integer of from 0 to 5, and R's, which may be the same or different, represent a alkyl group, and (e) urea derivatives represented by the following formula:

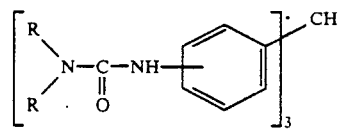

wherein R's, which may be the same or different, represent a lower alkyl group.

In this embodiment, if a dimethylamine adduct represented by the following formula:

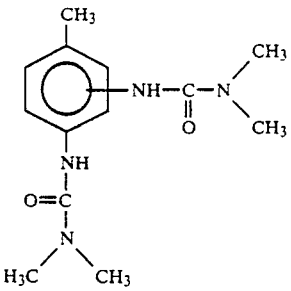

is used as the curing promotor, a composition having a highest flowability and hence, an excellent injection moldability can be obtained.

DETAILED DESCRIPTION OF THE PREFERRED EMBODIMENTS

The present invention is based on the novel finding that if specific silica, that is, pulverized silica having a maximum particle size of up to 130 μm and an average particle size of up to 30 μm and/or spherical silica having a maximum particle size of up to 200 μm and an average particle size of up to 50 μm, is incorporated into a composition comprising an epoxy resin, a phenol-novolak resin and a curing promotor, high filling becomes possible while retaining a moldable flowability and an epoxy resin having such a small molding shrinkage as not attainable by the conventional silica-epoxy resin composition can be obtained. If a halogenated epoxy resin and antimony oxide and/or a glass fiber are incorporated in this epoxy resin composition, the flame retardancy is prominently improved, and by dint of the combination of this improved flame retardancy and the above-mentioned reduced molding shrinkage, the composition can be effectively used as a composition for sealing a semiconductor.

Furthermore, the present invention is based on the novel finding that if a specific urea derivative and specific spherical silica are incorporated in a composition comprising an epoxy resin and a phenol-novolak resin, the stability at about 100° C. is highly improved and the molding shrinkage is much reduced, and the flowability is improved and injection molding becomes possible. Accordingly, not only transfer molding adopted in the conventional technique but also injection molding is possible, and the composition can be easily applied to the manufacture of a precision-molded article having a complicated structure and the application field is greatly broadened.

The epoxy resin used in the present invention is an epoxy resin having at least two epoxy groups in one molecule, and there can be mentioned epoxy resins and alicyclic epoxy resins synthesized from epichlorohydrin and bisphenol A or a novolak. A novolak type epoxy resin having an epoxy equivalent of 100 to 300 and a softening point of 60° to 110° C. is especially preferably used.

As the phenol-novolak resin, there can be mentioned a novolak-type phenolic resin obtained by reacting a phenol such as phenol, cresol or xylenol with formaldehyde in the presence of an acid catalyst, and a modification product thereof, for example, an epoxidized or butylated novolak-type phenolic resin. A phenol-novolak resin having a hydroxyl group equivalent of 100 to 150 and a softening point of 60° to 110° C. is preferably used.

The phenol-novolak resin is incorporated in an amount of 20 to 120 parts by weight, preferably 40 to 60 parts by weight, per 100 parts by weight of the epoxy resin. This amount corresponds to such a mixing ratio that 0.5 to 2.0, preferably about one, of phenolic hydroxyl groups are present per epoxy group contained in the epoxy resin.

If the amount incorporated of the phenol-novolak resin is outside the above-mentioned range, curing is not sufficiently advanced, and the physical properties of the molded article are degraded.

As the curing promotor, there can be mentioned 1,8-diazabicyclo(5,4,0)undecene-7 (hereinafter referred to as DBU) and DBU derivatives such as phenol salts, phenol-novolak salts and carbonates of DBU, imidazoles such as 2-methylimidazole, 2-phenylimidazole, 2-heptadecylimidazole, 2-ethyl-4-methylimidazole and 2-phenyl-4-methylimidazole, organophosphine compounds ordinarily included in primary phosphines, secondary phosphines and tertiary phosphines, such as ethylphosphine, propylphosphine, phenylphosphine, triphenylphosphine and trialkylphosphines, and urea derivatives represented by the formula of Ar-NH-CO-N (Ar represents a substituted or unsubstituted aryl group).

Especially, if an alkylurea derivative as described below is incorporated as the curing promotor, the stability of the composition at about 100° C. is highly improved. As examples of the alkylurea derivative, the following compounds can be mentioned.

(a) An alkylurea derivative represented by the following formula:

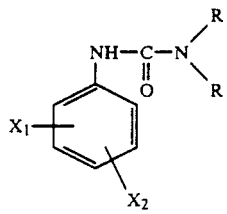

wherein $X_1$ and $X_2$, which may be the same or different, represent a hydrogen atom, a halogen atom, a lower alkyl group, a lower alkoxy group or a nitro group, and R's, which may be the same or different, represent a lower alkyl group.

As examples of the compound of this type, there can be mentioned 3-phenyl-1,1-dimethylurea, 3-(p-chlorophenyl)-1,1-dimethylurea, 3-(3,4-dichlorophenyl)-1,1-dimethylurea, 3-(o-methylphenyl)-1,1-dimethylurea, 3-(p-methylphenyl)-1,1-dimethylurea, 3-(methoxyphenyl)-1,1-dimethylurea and 3-(nitrophenyl)-1,1-dimethylurea.

(b) An alkylurea derivative represented by the following formula

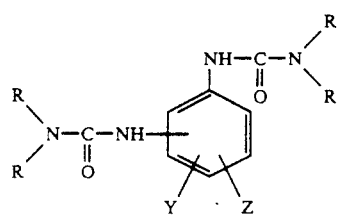

wherein Y and Z, which may be the same or different, represent a hydrogen atom, a halogen atom or a lower alkyl group, and R's, which may be the same or different, represent a lower alkyl group.

As examples of the compound of this type, there can be mentioned 1,1'-phenylene-bis(3,3-dimethylurea) and 1,1'-(4-methyl-m-phenylene)-bis(3,3-dimethylurea).

(c) An alkylurea derivative represented by the following formula:

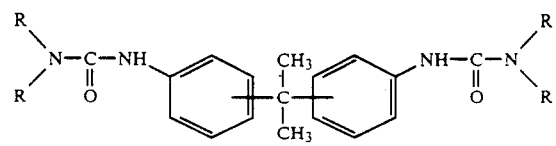

wherein R's, which may be the same or different. represent a lower alkyl group.

(d) An alkylurea derivative represented by the following formula:

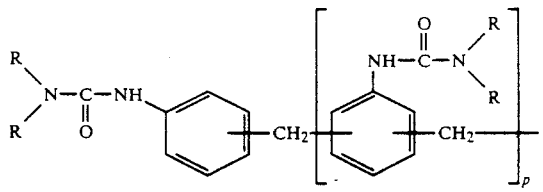

wherein p is an integer of from 0 to 5, and R's, which may be the same or different, represent a lower alkyl group.

(e) An alkylurea derivative represented by the following formula:

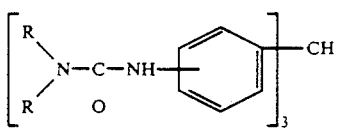

wherein R's, which may be the same or different, represent a lower alkyl group.

Furthermore, there can be mentioned a 2,4-tolylene diisocyanate/dialkylamine adduct represented by the following formula:

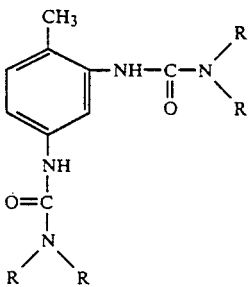

wherein R's, which may be the same or different, represent a lower alkyl group.

In the curing promotors (a) through (e), the lower alkyl and lower alkoxy groups $X_1$, $X_2$ and R are preferably methyl, ethyl, propyl and butyl groups, and corresponding alkoxy groups. A 2,4-tolylene diisocyanate/dimethylamine adduct is especially preferable as the curing promotor (e) of this type. Namely, when this dimethylamine adduct is incorporated as the curing promotor, the stability at about 100° C. is highly improved and curing characteristics suitable for the injection molding can be attained.

The curing promotor is incorporated in an amount of 3 to 20 parts by weight, preferably 5 to 10 parts by weight, per 100 parts by weight of the epoxy resin. If the amount of the curing promotor is smaller than 3 parts by weight, the time required for the curing in a mold becomes long and the molding cycle becomes long. If the amount of the curing promotor exceeds 20 parts by weight, the stability at about 100° C. is degraded.

As the filler to be used in the present invention, there can be used powdery, fibrous and balloon inorganic fillers such as talc, mica, calcium carbonate, clay, alumina, alumina-silica, pulverized or spherical silica, zinc oxide, carbon, aluminum hydroxide, asbestos fiber, glass fiber, carbon fiber, glass bead, shirasu balloon and silica balloon, and organic fillers such as synthetic resin powder, synthetic fiber flock and phenolic resin balloon.

An inorganic filler is preferable, and pulverized silica, spherical silica and glass fiber are especially preferable.

Pulverized silica having a maximum particle size of up to 130 μm, preferably up to 60 μm, and an average particle size of up to 30 μm, preferably up to 8 μm, is used.

Spherical silica having a maximum particle size of up to 200 μm and an average particle size of up to 30 μm, preferably up to 5 μm, is used.

If pulverized silica and spherical silica satisfy the above-mentioned particle size requirements, they can be filled at high filling ratios in the epoxy resin composition and the surface roughness is prominently improved, and a molded article having such a small molding shrinkage as about 0.008 to about 0.1% can be provided.

Pulverized silica and spherical silica can be incorporated singly or in combination. If pulverized silica or spherical silica is singly incorporated, the silica is incorporated in an amount of 130 to 700 parts by weight, preferably 200 to 620 parts by weight, per 100 parts by weight of the sum of the epoxy resin and phenol-novolak resin. If pulverized silica and spherical silica are incorporated in combination, they are used at a pulverized silica/spherical silica weight ratio of (50 to 80)/(100 to 600), preferably (22 to 108)/(117 to 583).

By dint of the fact that the epoxy resin composition of the present invention comprises components (A) through (D) as the indispensable components, the epoxy resin composition can be molded into a molded article having such a small molding shrinkage as about 0.008 to about 0.1% and having a dimension precision comparable to that of a metal. Accordingly, the epoxy resin composition of the present invention can be used for the production of not only precision-molded articles such as electrical and electronic parts but also molded articles that can be used as substitutes for stainless steel products, aluminum die-cast products, zinc die-cast products and ceramic products.

In the present invention, if the halogenated epoxy resin (E) and antimony oxide (F) are incorporated into the components (A) through (D), the flame retardancy of the resin composition is drastically improved, and the resin composition can be preferably used not only for the production of molded articles as mentioned above but also as a sealing material for a semiconductor.

Furthermore, in the present invention, if glass fiber (G) is incorporated into the resin composition comprising the above-mentioned components (A) through (D) or (A) through (F), a resin composition having a reduced molding shrinkage and high tensile strength and flexural strength can be provided.

As the halogenated epoxy resin, there can be mentioned epoxy resins in which a halogen atom such as chlorine or bromine is introduced, and a brominated novolak-type epoxy resin having an epoxy equivalent of 100 to 300 is preferably used. If this halogenated epoxy resin is used in combination with antimony oxide, a resin composition having an excellent flame retardancy can be obtained.

Incorporation of various flame retardants into epoxy resin compositions for sealing semiconductors is well-known. As the flame retardant, there are known chlorinated paraffin, bromotoluene, hexabromobenzene and antimony oxide.

According to the present invention, by selecting antimony oxide (more specifically, antimony trioxide) among these flame retardants and using the halogenated epoxy resin in combination with this antimony trioxide, a synergistically improved flame-retardant effect can be attained.

The halogenated epoxy resin is incorporated in an amount of 15 to 30 parts by weight, preferably 20 to 27 parts by weight, per 100 parts by weight of the resin, and antimony oxide is incorporated in an amount of 3 to 10 parts by weight, especially 3 to 6 parts by weight, per 100 parts by weight of the epoxy resin.

If the amounts incorporated of the halogenated epoxy resin and antimony oxide are too small and below the above-mentioned ranges, the flame-retardant effect in the epoxy resin composition is not sufficient, and even if the amounts of the halogenated epoxy resin and antimony oxide exceed the above-mentioned ranges, no further improvement of the flame-retardant effect is attained and an economical disadvantage is brought about, and the excessive incorporation results in degradation of the physical properties of the molded article.

Chopped strands, roving milled glass fibers and glass flakes having a diameter of 1 to 20 μm, preferably about 1 to about 13 μm, and a length of 0.1 to 10 mm, preferably about 0.5 to about 6 mm, are used as the glass fiber. The glass fiber is incorporated in an amount of 1 to 30 parts by weight, preferably 1 to 5 parts by weight, per 100 parts by weight of the silica. Namely, the amount incorporated of the glass fiber is determined relatively to the amount incorporated of the silica, and if the amount of the glass fiber is below the above-mentioned range, the reinforcing effect is not sufficient and if the amount of the glass fiber exceeds the above-mentioned range, the kneading with the epoxy resin composition is not sufficiently conducted and the formation of a molded article by the precision molding becomes difficult.

In addition to the above-mentioned indispensable components, other known additives can be incorporated into the epoxy resin composition of the present invention, so far as the physical properties of the composition are not degraded.

For example, there can be mentioned releasing agents such as natural waxes, e.g., carnauba wax, synthetic waxes, metal salts of linear fatty acids, e.g., stearic acid, acid amides, esters and paraffins, colorants such as carbon black, flame retardants such as halogenated polyhydric phenols, e.g., tetrabromobisphenol A, and brominated novolak epoxy resins, coupling agents such as γ-glycidoxypropyltrimethoxysilane, flexibilizers such as organopolysiloxanes, organopolysiloxane-modified phenols and modified butadiene rubbers, and inorganic fillers customarily incorporated into epoxy resins, such as alumina, carbon fibers, glass beads, mica, talc and calcium carbonate.

EXAMPLES

The present invention will now be described in detail with reference to the following examples that by no means limit the scope of the invention.

EXAMPLES 1 THROUGH 6 AND COMPARATIVE EXAMPLES 1 THROUGH 4

Components Incorporated
A: o-cresol novolak type epoxy resin (Epoxy Resin 215)
B: phenol-novolak resin (phenol equivalent = 104)
C: brominated novolak type epoxy resin (epoxy equivalent = 275)
D: antimony oxide
E: carnauba wax
F: -glycidoxypropyltrimethoxysilane
G: carbon black
H: spherical silica (maximum particle size = 128 μm, average particle size = 20.7 μm)
I: spherical silica (maximum particle size = 40 μm, average particle size = 3 μm)
J: pulverized silica (maximum particle size = 10 m, average particle size = 1.8 μm)
K: glass fiber (diameter = 13 μm, length = 3 mm)
L: 2,4-tolylene diisocyanate/dimethylamine adduct
M: triphenylphosphine
N: 2-methylimidazole
O: pulverized silica (maximum particle size = 130 m, average particle size = 14 μm)
P: pulverized silica (maximum particle size = 180 m, average particle size = 21.3 μm)

Preparation of Composition

The above-mentioned components were mixed at ratios shown in Table 1, and the mixture was heated at 110° C., kneaded for 5 minutes by an 8-inch roll, cooled and pulverized to obtain a homogeneous epoxy resin Molding of Test Piece The resin composition was transfer-molded at a molding temperature of 160° C. under a pressure of 150 kg/cm$^2$ for a molding time of 5 minutes, and the obtained test piece was post-cured at 180° C. for 6 hours.

By using the obtained test piece, the following measurements were conducted, and the obtained results are shown in Table 2.

Test Items
Roll kneadability:

Kneading was carried out at 110° C. by using an 8-inch roll. The sample wound around the roll is indicated by mark "○" and the sample that could not be kneaded is indicated by mark "X".

Spiral flow:

The spiral flow was measured at a molding temperature of 150° C. under a molding pressure of 70 kg/cm$^2$ by using a mold specified in EMMI 1-66 Standard.

Molding shrinkage:

According to the method of JIS K-6911, a disk for the measurement of the molding shrinkage was formed under the above-mentioned molding conditions, and the dimensions were measured by a three-dimensional measuring machine (Xyzax GC1000D-34U1 supplied by Tokyo Seimitsusha) and the molding shrinkage was determined. Measurement of dimensions of molded article:

A column having an outer diameter of 3 mm and a length of 10 mm was molded (transfer-molded) at a temperature of 170° C. under a pressure of 190 kg/cm$^2$ for a molding time of 5 minutes (post curing was not carried out), and the dimensions were measured by Roncom 50A-312 supplied by Tokyo Seimitsusha. Dimensional change of outer diameter by wet heat test:

The above-mentioned columnar sample (having outer diamter A) was allowed to stand still in an atmosphere maintained at a temperature of 60° C. and a relative humidity of 95% for 100 hours, and the temperature was lowered to room temperature again. The outer diameter B of the sample was measured and the dimensional change (A-B) of the outer diameter was determined by the pin gauge method. Combustion test:

The vertical combustion test was carried out according to the method of JIS K-6911, and the sample having a good flame retardancy is indicated by mark "○" and the sample having a poor flame retardancy is indicated by mark "X".

TABLE 1

| Components | Example No. | | | | | | Comparative Example No. | | | |
|---|---|---|---|---|---|---|---|---|---|---|
| | 1 | 2 | 3 | 4 | 5 | 6 | 1 | 2 | 3 | 4 |
| A | 100 | 100 | 100 | 100 | 100 | 100 | 100 | 100 | 100 | 100 |
| B | 45 | 45 | 45 | 45 | 45 | 45 | 45 | 45 | 45 | 45 |
| C | 27 | 27 | 27 | 27 | 27 | 27 | 27 | 27 | 27 | 27 |
| D | 5 | 5 | 5 | 5 | 5 | 5 | 5 | 5 | 5 | 5 |
| E | 2 | 2 | 2 | 2 | 2 | 2 | 2 | 2 | 2 | 2 |
| F | 7.2 | 2.7 | 2.7 | 7.2 | 7.2 | 7.2 | 5 | 5 | 6 | 5 |
| G | 1 | 1 | 1 | 1 | 1 | 1 | 1 | 1 | 1 | 1 |
| H | 800 | — | — | 800 | 800 | 800 | — | — | — | — |
| I | — | 300 | — | — | — | — | — | — | — | — |
| J | — | — | 300 | — | — | — | — | — | — | — |

TABLE 1-continued

| Components | Example No. 1 | 2 | 3 | 4 | 5 | 6 | Comparative Example No. 1 | 2 | 3 | 4 |
|---|---|---|---|---|---|---|---|---|---|---|
| K | 30 | 30 | 30 | 30 | 30 | 30 | 30 | 30 | 30 | 30 |
| L | 8 | 8 | 8 | — | — | — | 8 | 8 | 8 | — |
| M | — | — | — | 2 | 1 | — | — | — | — | — |
| N | — | — | — | — | — | 1 | — | — | — | 1 |
| O | — | — | — | — | — | — | 550 | — | 650 | 550 |
| P | — | — | — | — | — | — | — | 550 | — | — | unit: part by weight

TABLE 2

| | Unit | Example No. 1 | 2 | 3 | 4 | 5 | 6 | Comparative Example No. 1 | 2 | 3* | 4 |
|---|---|---|---|---|---|---|---|---|---|---|---|
| Roll kneadability | — | ○ | ○ | ○ | ○ | ○ | ○ | ○ | ○ | X | ○ |
| Spiral flow | inch | 27 | 25 | 23 | 24 | 20 | 23 | 12 | 13 | — | 11 |
| Molding shrinkage | % | 0.11 | 0.3 | 0.28 | 0.11 | 0.10 | 0.10 | 0.4 | 0.42 | — | 0.45 |
| Dimensions of molded arrticle | | | | | | | | | | | |
| outer diameter | mm | 2.999 | 2.998 | 2.998 | 2.999 | 2.999 | 2.999 | 2.995 | 2.994 | — | 2.993 |
| circularity | μ | 0.7 | 0.5 | 0.5 | 0.7 | 0.7 | 0.7 | 1.3 | 1.5 | — | 1.4 |
| coaxiality | μ | 0.5 | 0.4 | 0.4 | 0.5 | 0.5 | 0.5 | 0.9 | 1.0 | — | 1.0 |
| cylindricity | μ | 0.5 | 0.5 | 0.5 | 0.5 | 0.5 | 0.5 | 0.9 | 1.0 | — | 1.0 |
| surface roughness | μ | 0.5 | 0.4 | 0.3 | 0.5 | 0.5 | 0.5 | 0.7 | 0.9 | — | 0.9 |
| Outer diameter of mold | mm | 3.000 | 3.000 | 3.000 | 3.000 | 3.000 | 3.000 | 3.000 | 3.000 | 3.000 | 3.000 |
| Dimensional change of outer diameter by wet heat treatment | μ | 1.0 | 2.0 | 2.0 | 1.0 | 1.0 | 0.7 | 3.0 | 3.0 | — | 2.7 |
| Combustion test | — | ○ | ○ | ○ | ○ | ○ | ○ | ○ | ○ | — | ○ |

Note:
*The composition of Comparative Example 3 could not be kneaded by the roll and formation of the test piece was impossible.

EXAMPLES 7-1, 7-2, 7-3 and 7-4

Components Incorporated
A: phenol-novolak type epoxy resin
B: phenol-novolak resin
C: carnauba wax
D: carbon black
E: spherical silica (maximum particle size=192 μm, average particle size=20.5 μm)
F: 2,4-tolylene diisocyanate/dimethylamine adduct
G: triphenylphosphine
H: 2-methylimidazole
I: phenol-novolak salt of 1,8-diazbicyclo(5,4,0)-undecene-7

These components were mixed at ratios shown in Table 3, and compositions and test pieces were prepared in the same manner as describe in Examples 1 through 6.

Test Items
Gel time:
The gel time was measured by using LaboPlastomill 20 R200 supplied by Toyo Seiki according to the following procedures. The above apparatus heated at 180° C. and provided with a rotor rotated at 30 rpm was charged with 43 g of the sample which had been pulverized by a power mill so that the pulverized sample could pass through a 3-mm screen, and the sample was kneaded. From the results of the measurement of the torque by a chart recorder, four tangents were drawn to the region where the torque was reduced after the charging of the sample [tangent (1)], the region where the minimum torque was maintained [tangent (2)], the region where the torque was increasing [tangent (3)] and the point of the maximum torque [tangent (4)], respectively. The time of from the intersection point of the tangents (1) and (2) to the intersection point of the tangents (3) and (4) was designated as the gel time.

Tg:
Tg was measured according to the method of JIS K-6911.

Water absorption:
A flat plate having a size of 30 mm × 30 mm and a thickness of 4 mm was boiled for 6 hours, and then, the water absorption was measured. Electric resistance:
A flat plate having a size of 100 mm × 100 mm and a thickness of 2 mm was used as a test piece, and the electric resistance was measured according to JIS K-6911.

TABLE 3

| Components | Example No. 7-1 | 7-2 | 7-3 | 7-4 |
|---|---|---|---|---|
| A | 100 | 100 | 100 | 100 |
| B | 55 | 55 | 55 | 55 |
| C | 2 | 2 | 2 | 2 |
| D | 1 | 1 | 1 | 1 |
| E | 400 | 400 | 400 | 400 |
| F | 10 | — | — | — |
| G | — | 2.1 | — | — |
| H | — | — | 1 | — |
| I | — | — | — | 8 | unit: part by weight

TABLE 4

| Test Items | Unit | Example 7-1 | Example 7-2 | Example 7-3 | Example 7-4 |
|---|---|---|---|---|---|
| Gel time | | | | | |
| 100° C. | second | 1230 | 390 | 120 | 480 |
| 150° C. | second | 82 | 60 | 45 | 81 |
| 180° C. | second | 30 | 30 | 24 | 30 |

TABLE 4-continued

| Test Items | Unit | Example 7-1 | Example 7-2 | Example 7-3 | Example 7-4 |
|---|---|---|---|---|---|
| Tg | °C. | 165 | 160 | 169 | 160 |
| Water absorption | % | 0.1 | 0.1 | 0.1 | 0.1 |
| Electric resistance | | | | | |
| 21° C. | Ω-cm | $10^{15}<$ | $10^{15}<$ | $10^{15}<$ | $10^{15}<$ |
| 150° C. | Ω-cm | $3 \times 10^{13}$ | $1 \times 10^{13}$ | $2 \times 10^{12}$ | $3 \times 10^{13}$ |

As is apparent from the results shown in Table 4, the composition of Example 7-1 is sufficiently adaptable to the molding cycle in the injection molding since the gel time about 100° C. is very long. The epoxy resin compositions of Examples 7-2 through 7-4 are slightly inferior in the injection moldability but they are satisfactory in other points.

EXAMPLE 8

The procedures of Example 7 were repeated by gradually increasing the amount of the spherical silica, and the spiral flow (EMMI 1-66, 150° C., 70 kg/cm$^2$) was measured. The obtained results are shown in Table 5.

TABLE 5

| Amount (parts by weight) of spherical silica | Mixing ratio of silica to total composition (%) | Spiral Flow (cm) |
|---|---|---|
| 414 | 70 | 120 |
| 426 | 72 | 90 |
| 437 | 74 | 77 |
| 450 | 76 | 70 |
| 461 | 78 | 60 |
| 473 | 80 | 50 |

EXAMPLES 9-1 to 9-6

Components Incorporated
A: phenol-novolak type epoxy resin
B: phenol-novolak resin
C: carnauba wax
D: carbon black
E: pulverized silica (maximum particle size=128 um, average particle size=12 μm)
F: 2,4-tolylene diisocyanate/dimethylamine adduct
G: triphenylphosphine
H: 2-methylimidazole
I: phenol-novolak salt of 1,8-diazabicyclo(5,4,0)-undecene-7

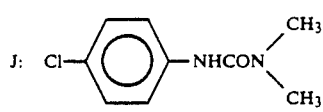

J:

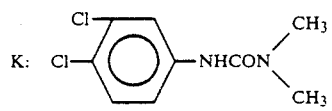

K:

Preparation of Composition

The above components were mixed at ratios shown in Table 6 and kneaded for minutes by an 8-inch roll heated at 110° C., and the kneaded mixture was cooled and pulverized to obtain a homogeneous epoxy resin composition.

Formation of Test Piece by Molding

Each composition shown in Table 6 was transfer-molded at a temperature of 160° C. under a pressure of 120 kg/cm$^2$ for a molding time of 5 minutes to form a test piece. Then, the test piece was postcured at 180° C. for 6 hours.

With respect to the test items described in Example 7, the measurements were conducted on the obtained test pieces in the same manner as described in Example 7. The obtained results are shown in Table 7.

TABLE 6

| | Example No. | | | | | |
|---|---|---|---|---|---|---|
| Components | 9-1 | 9-2 | 9-3 | 9-4 | 9-5 | 9-6 |
| A | 100 | 100 | 100 | 100 | 100 | 100 |
| B | 55 | 55 | 55 | 55 | 55 | 55 |
| C | 2 | 2 | 2 | 2 | 2 | 2 |
| D | 1 | 1 | 1 | 1 | 1 | 1 |
| E | 550 | 550 | 550 | 550 | 550 | 550 |
| F | 10 | — | — | — | — | — |
| G | — | 2.1 | — | — | — | — |
| H | — | — | 1 | — | — | — |
| I | — | — | — | 3 | — | — |
| J | — | — | — | — | 8.3 | — |
| K | — | — | — | — | — | 8.3 | unit: part by weight

TABLE 7

| Test Items | Unit | Example 9-1 | Example 9-2 | Example 9-3 | Example 9-4 | Example 9-5 | Example 9-6 |
|---|---|---|---|---|---|---|---|
| Gel Time | | | | | | | |
| 100° C. | second | 1800 | 390 | 300 | 1160 | 1100 | 1122 |
| 150° C. | second | 80 | 60 | 60 | 160 | 110 | 107 |
| 180° C. | second | 30 | 30 | 28 | 72 | 50 | 45 |
| Tg | °C. | 165 | 130 | 172 | 142 | 165 | 166 |
| Water absorption | % | 0.08 | 0.05 | 0.05 | 0.03 | 0.3 | 0.3 |
| Electric resistance | | | | | | | |
| 21° C. | Ω-cm | $10^{15}<$ | $10^{15}<$ | $10^{15}<$ | $10^{15}<$ | $10^{15}<$ | $10^{15}<$ |
| 150° C. | Ω-cm | $8 \times 10^{13}$ | $5 \times 10^{13}$ | $2 \times 10^{12}$ | $5 \times 10^{13}$ | $3 \times 10^{13}$ | $2.7 \times 10^{13}$ |

As is apparent from the results shown in Table 7, since the gel time of the composition of Example 9-1 at about 100° C. is very long, the composition is sufficiently adapted to the molding cycle at the injection molding, and although the injection moldability is relatively reduced in case of the epoxy resin compositions of Examples 9-2 through 9-6, the injection molding becomes possible in these compositions.

EXAMPLE 10

The procedures of Example 9 were repeated by gradually increasing the amount of the pulverized silica, and the spiral flow (EMMI 1-66, 150° C., 70 kg/cm$^2$) was measured. The obtained results are shown in Table 8.

EXAMPLE 11

The composition described in Example 1 was supplied into an injection molding machine (Model JT20R20V supplied by Nippon Seikosho) (clamping pressure = 20 tons, injection volume = 20 cm$^3$, plasticizing capacity = 15 kg/hr, injection pressure = 1790 kg/cm$^2$), and was injection-molded under the following conditions.

Cylinder temperature = 40° C. (upper portion of hopper) and 100° C. (lower portion of hopper)
Mold temperature: 180° C.
Injection time: 15 seconds
Curing time: 25 seconds
Injection pressure: 200 kg/cm$^2$ As the result, semiconductor molded articles having certain quantities could be simply manufactured in large quantities, and the obtained semiconductors had an excellent dimension stability and no molding shrinkage was caused. The obtained semiconductors exerted excellent functions as precision parts.

TABLE 8

| Amount (parts by weight) of pulverized silica | Mixing ratio of silica to total composition (%) | Spiral Flow (cm) |
|---|---|---|
| 414 | 70 | 85 |
| 426 | 72 | 70 |
| 437 | 74 | 50 |
| 450 | 76 | 40 |

We claim:
1. An epoxy resin composition which comprises, as indispensable components,
(A) an epoxy resin,
(B) a phenol-novolak resin,
(C) a curing promoter selected from the group consisting of:
(a) urea derivatives represented by the following formula:

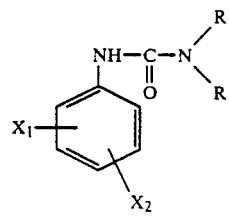

wherein X$_1$ and X$_2$, which may be the same or different, represent a hydrogen atom, a halogen atom, a lower alkyl group, a lower alkoxy group or a nitro group, and the R groups which may be the same or different represent a lower alkyl group,
(b) urea derivatives represented by the following formula:

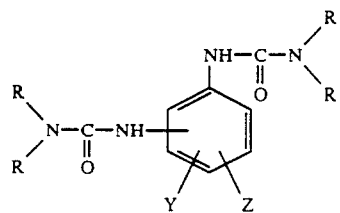

wherein Y and Z, which may be the same or different, represent a hydrogen atom, a halogen atom or a lower alkyl group, and R's, which may be the same or different, represent a lower alkyl group,
(c) urea derivatives represented by the following formula:

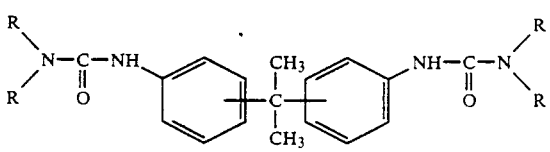

wherein the R groups, which may be the same or different, represent a lower alkyl group,
(d) urea derivatives represented by the following formula:

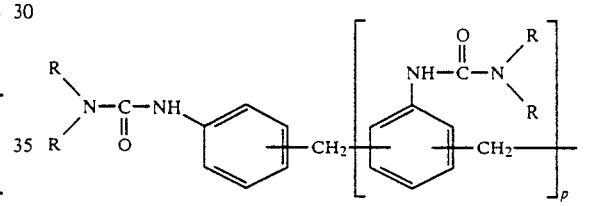

wherein p is an integer of from 0 to 5, and the R groups which may be the same or different, represent a lower alkyl group, and
(e) urea derivatives represented by the following formula:

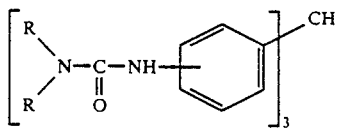

wherein the R groups, which may be the same or different, represent a lower alkyl group; and
(D) a filler consisting essentially of spherical silica having a maximum particle size of up to 200 μm and an average particle size of up to 50 μm; wherein the phenol-novolak resin (B) is incorporated in an amount of 20 to 120 parts by weight per 100 parts by weight of the epoxy resin (A), the curing promoter (C) is incorporated in an amount of 0,1 to 15 parts per 100 parts by weight of the epoxy resin (A), and the spherical silica (D) is incorporated in an amount of 130 to 700 parts by weight per 100 parts by weight of the sum of the components (A) and (B).

2. A composition as set forth in claim 1, wherein the epoxy resin is a novolak epoxy resin having an epoxy equivalent of 100 to 300.

3. A composition as set forth in claim 1, wherein the phenol-novolak resin is a novolak phenolic resin having a hydroxyl group equivalent of 100 of 150 and a softening point of 60° to 110° C., or a modification product thereof.

4. A composition as set forth in claim 1, wherein the curing promoter is a 2,4-tolylene diisocyanate/dimethylamine adduct represented by the following formula:

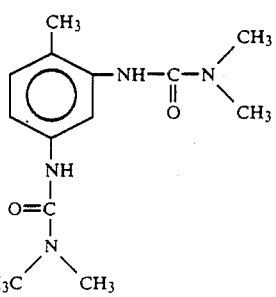

5. A composition as set forth in claim 1, wherein the spherical silica has a maximum particle size of up to 30 μm and an average particle size of up to 5 μm.

6. A composition as set forth in claim 1 which further comprises
(E) a halogenated epoxy/resin,
(F) antimony oxide, and/or
(G) a glass fiber.

7. A composition as set forth in claim 6, wherein the halogenated epoxy resin (E) is incorporated in an amount of 15 to 30 parts by weight per 100 parts by weight of the epoxy resin (A) and the antimony oxide (F) is incorporated in an amount of 3 to 10 parts by weight per 100 parts any weight of the epoxy resin (A).

8. A composition as set forth in claim 5, wherein the halogenated epoxy resin is a brominated novolak epoxy resin.

9. A sealing material for semiconductors, which comprises compositions as set forth in claim 1 or 5.

10. A precision-molded article comprising a composition as set forth in claim 1.

11. A precision-molded article comprising a composition as set forth in claim 5.

* * * * *